US010999065B2

(12) United States Patent
Yang et al.

(10) Patent No.: US 10,999,065 B2
(45) Date of Patent: *May 4, 2021

(54) METHOD AND APPARATUS FOR UPDATING A KEY IN AN ACTIVE STATE (71) Applicant: HUAWEI TECHNOLOGIES CO., LTD., Guangdong (CN)

(72) Inventors: Yanmei Yang, Beijing (CN); Min Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/999,503

(22) Filed: Aug. 20, 2018

(65) Prior Publication Data

US 2019/0007832 A1 Jan. 3, 2019

Related U.S. Application Data (63) Continuation of application No. 14/674,155, filed on Mar. 31, 2015, now Pat. No. 10,057,769, which is a (Continued)

(30) Foreign Application Priority Data

Sep. 28, 2007 (CN) .......................... 200710151885.5

(51) Int. Cl.
*H04L 29/06* (2006.01)
*H04L 9/08* (2006.01)
(Continued)

(52) U.S. Cl.
CPC .......... *H04L 9/0844* (2013.01); *H04L 9/0891* (2013.01); *H04L 63/068* (2013.01);
(Continued)

(58) Field of Classification Search
CPC ..... H04W 12/06; H04W 12/08; H04W 12/04; H04W 12/0401; H04W 12/04033;
(Continued)

(56) References Cited

U.S. PATENT DOCUMENTS 5,241,598 A    8/1993   Raith
5,265,164 A   11/1993   Matyas et al.
(Continued)

FOREIGN PATENT DOCUMENTS

CN     1642073 A    7/2005
CN     1777094 A    5/2006
(Continued)

OTHER PUBLICATIONS

3GPP, 3GPP TR 33.821 V0.3.0 (May 2007), 3GPP, May 2007.*
(Continued)

*Primary Examiner* — David Garcia Cervetti (57) ABSTRACT

A method for updating a key in an active state is disclosed according to the embodiments of the present invention. The method includes steps of: initiating a key update by a user equipment in the active state or a network side when a pre-defined condition is met; updating the key by the network side and the user equipment, and negotiating an activation time of the new keys. An apparatus for updating a key in an active state is also disclosed according to the present invention. With the present invention, the user equipment in an active state and the network side may actively initiate the key update procedure in different cases, thereby solving the problem concerning the key update for a session in an active state.

20 Claims, 7 Drawing Sheets

Related U.S. Application Data continuation of application No. 13/587,340, filed on Aug. 16, 2012, now Pat. No. 9,031,240, which is a continuation of application No. 12/748,798, filed on Mar. 29, 2010, now Pat. No. 8,300,827, which is a continuation of application No. PCT/CN2008/072534, filed on Sep. 25, 2008.

(51) Int. Cl.
*H04W 12/041* (2021.01)
*H04W 12/04* (2021.01)
*H04W 12/06* (2021.01)
*H04W 12/08* (2021.01)

(52) U.S. Cl.
CPC ............ *H04L 63/08* (2013.01); *H04W 12/041* (2021.01); *H04W 12/04031* (2019.01); *H04W 12/06* (2013.01); *H04W 12/08* (2013.01); *H04L 2209/80* (2013.01)

(58) Field of Classification Search
CPC ........ H04W 12/04031; H04W 36/0038; H04L 63/08; H04L 9/0891; H04L 9/0844; H04L 63/068; H04L 2209/80; H04L 63/062; H04L 2463/061
See application file for complete search history.

(56) References Cited

U.S. PATENT DOCUMENTS

| | | | |
|---|---|---|---|
| 5,404,404 A | 4/1995 | Novorita | |
| 5,551,073 A * | 8/1996 | Sammarco | H04W 12/04 455/411 |
| 5,661,803 A | 8/1997 | Cordery et al. | |
| 5,742,682 A | 4/1998 | Baker et al. | |
| 5,752,190 A * | 5/1998 | Kaewell, Jr. | H04W 36/0085 455/436 |
| 5,761,306 A | 6/1998 | Lewis | |
| 5,805,705 A | 9/1998 | Gray et al. | |
| 5,812,666 A | 9/1998 | Baker et al. | |
| 5,862,452 A | 1/1999 | Cudak et al. | |
| 5,887,251 A * | 3/1999 | Fehnel | H04L 63/08 455/411 |
| 5,966,443 A * | 10/1999 | Gonzalez | H04L 9/083 380/2 |
| 5,974,325 A * | 10/1999 | Kotzin | H04W 16/26 455/15 |
| 5,991,405 A | 11/1999 | Mills | |
| 6,671,507 B1 * | 12/2003 | Vinck | H04W 12/069 455/411 |
| 6,701,435 B1 | 3/2004 | Numao et al. | |
| 6,876,747 B1 * | 4/2005 | Faccin | H04L 63/06 380/247 |
| 7,123,719 B2 | 10/2006 | Sowa et al. | |
| 7,225,161 B2 | 5/2007 | Lam et al. | |
| 7,245,724 B1 | 7/2007 | Chesson et al. | |
| 7,322,041 B2 | 1/2008 | Bilgic et al. | |
| 7,526,092 B2 | 4/2009 | Chesson et al. | |
| 7,907,733 B2 | 3/2011 | Cho et al. | |
| 7,936,880 B2 | 5/2011 | Huang et al. | |
| 8,019,083 B2 | 9/2011 | Huang et al. | |
| 8,023,658 B2 | 9/2011 | Yang et al. | |
| 8,073,428 B2 | 12/2011 | Khetawat et al. | |
| 8,081,759 B2 | 12/2011 | Faccin et al. | |
| 8,150,397 B2 | 4/2012 | Khetawat et al. | |
| 8,494,163 B2 | 7/2013 | Casati et al. | |
| 8,621,582 B2 * | 12/2013 | Boman | H04M 15/00 726/6 |
| 8,660,270 B2 * | 2/2014 | Blom | H04W 12/0471 380/278 |
| 8,948,393 B2 | 2/2015 | Maheshwari et al. | |
| 9,615,249 B2 * | 4/2017 | Blom | H04L 9/0816 |
| 2001/0041591 A1 | 11/2001 | Carroll | |
| 2002/0066011 A1 * | 5/2002 | Vialen | H04W 12/121 713/150 |
| 2002/0154776 A1 * | 10/2002 | Sowa | H04L 9/0869 380/247 |
| 2002/0154781 A1 * | 10/2002 | Sowa | H04L 63/062 380/278 |
| 2002/0164029 A1 | 11/2002 | Jiang | |
| 2003/0033522 A1 | 2/2003 | Bilgic et al. | |
| 2003/0092445 A1 * | 5/2003 | Timonen | H04W 12/033 455/439 |
| 2003/0099362 A1 | 5/2003 | Rollins | |
| 2003/0108007 A1 * | 6/2003 | Holcman | H04W 36/0038 370/331 |
| 2003/0109256 A1 * | 6/2003 | Holcman | H04W 12/04 455/436 |
| 2003/0133576 A1 | 7/2003 | Grumiaux | |
| 2003/0219129 A1 * | 11/2003 | Whelan | H04L 9/0891 380/270 |
| 2004/0071293 A1 | 4/2004 | Yamamichi et al. | |
| 2004/0072563 A1 * | 4/2004 | Holcman | H04W 36/0038 455/432.1 |
| 2004/0103202 A1 | 5/2004 | Hildebrand et al. | |
| 2005/0047598 A1 | 3/2005 | Kruegel | |
| 2005/0113070 A1 | 5/2005 | Okabe | |
| 2005/0176431 A1 * | 8/2005 | Herrero Veron | H04W 12/04 455/436 |
| 2005/0177723 A1 | 8/2005 | Huang et al. | |
| 2005/0226420 A1 | 10/2005 | Makela et al. | |
| 2005/0226423 A1 * | 10/2005 | Li | H04L 63/08 380/278 |
| 2006/0047601 A1 | 3/2006 | Peterka et al. | |
| 2006/0140410 A1 | 6/2006 | Aihara | |
| 2006/0178167 A1 * | 8/2006 | Tamura | H04B 7/022 455/560 |
| 2007/0003062 A1 * | 1/2007 | Mizikovsky | H04W 12/069 380/270 |
| 2007/0147620 A1 | 6/2007 | Zheng et al. | |
| 2007/0206799 A1 | 9/2007 | Wingert et al. | |
| 2007/0223706 A1 | 9/2007 | Gantman et al. | |
| 2007/0248232 A1 | 10/2007 | Driscoll et al. | |
| 2007/0249352 A1 * | 10/2007 | Song | H04L 63/08 455/436 |
| 2007/0253554 A1 | 11/2007 | Chesson et al. | |
| 2007/0265875 A1 | 11/2007 | Jiang et al. | |
| 2007/0271458 A1 | 11/2007 | Bosch et al. | |
| 2007/0277035 A1 | 11/2007 | Patel et al. | |
| 2007/0297610 A1 | 12/2007 | Chen et al. | |
| 2007/0298804 A1 | 12/2007 | Tamura et al. | |
| 2008/0002829 A1 | 1/2008 | Forsberg et al. | |
| 2008/0013737 A1 | 1/2008 | Sowa et al. | |
| 2008/0016248 A1 | 1/2008 | Tsirtsis et al. | |
| 2008/0039086 A1 * | 2/2008 | Gallagher | H04W 12/08 455/435.1 |
| 2008/0039096 A1 | 2/2008 | Forsberg | |
| 2008/0043669 A1 * | 2/2008 | Gallagher | H04W 92/02 370/329 |
| 2008/0080713 A1 * | 4/2008 | Cho | H04W 12/041 380/273 |
| 2008/0089293 A1 | 4/2008 | Madour et al. | |
| 2008/0095362 A1 | 4/2008 | Blom et al. | |
| 2008/0098467 A1 | 4/2008 | Miller et al. | |
| 2008/0101611 A1 | 5/2008 | Lindholm et al. | |
| 2008/0123851 A1 | 5/2008 | Guccione et al. | |
| 2008/0130902 A1 | 6/2008 | Foo Kune et al. | |
| 2008/0133921 A1 | 6/2008 | Yao | |
| 2008/0176572 A1 | 7/2008 | Forsberg | |
| 2008/0181411 A1 | 7/2008 | Norrman et al. | |
| 2008/0184032 A1 * | 7/2008 | Li | H04W 12/0431 713/171 |
| 2008/0188200 A1 * | 8/2008 | Forsberg | H04W 12/0431 455/410 |
| 2008/0207168 A1 * | 8/2008 | Forsberg | H04W 12/10 455/411 |
| 2008/0233947 A1 * | 9/2008 | Herrero-Veron | H04W 8/00 455/422.1 |
| 2008/0267407 A1 | 10/2008 | Vanderveen et al. | |
| 2008/0273704 A1 | 11/2008 | Norrman et al. | |

(56) References Cited

U.S. PATENT DOCUMENTS

| | | | |
|---|---|---|---|
| 2008/0318546 A1 | 12/2008 | Kitazoe et al. | |
| 2009/0034736 A1* | 2/2009 | French | H04W 12/04 380/278 |
| 2009/0061877 A1* | 3/2009 | Gallagher | H04W 76/12 455/436 |
| 2009/0073936 A1 | 3/2009 | Jentz et al. | |
| 2009/0100268 A1 | 4/2009 | Garcia et al. | |
| 2009/0164788 A1 | 6/2009 | Cho et al. | |
| 2009/0209259 A1 | 8/2009 | Brusilovsky et al. | |
| 2009/0235075 A1* | 9/2009 | Cho | H04L 9/0891 713/170 |
| 2009/0300358 A1 | 12/2009 | Pang et al. | |
| 2010/0002883 A1 | 1/2010 | Sammour et al. | |
| 2010/0056156 A1* | 3/2010 | Xu | H04L 9/14 455/436 |
| 2010/0095123 A1 | 4/2010 | He | |
| 2010/0111308 A1* | 5/2010 | Forsberg | H04L 9/0844 380/278 |
| 2010/0113033 A1 | 5/2010 | Qiu et al. | |
| 2010/0166184 A1* | 7/2010 | Wu | H04W 12/041 380/270 |
| 2010/0172500 A1* | 7/2010 | Wu | H04W 12/041 380/272 |
| 2010/0173610 A1 | 7/2010 | Kitazoe et al. | |
| 2010/0177897 A1 | 7/2010 | Mildh | |
| 2010/0190500 A1* | 7/2010 | Choi | H04W 36/36 455/436 |
| 2010/0246533 A1* | 9/2010 | Lundin | H04W 36/0066 370/332 |
| 2010/0278161 A1 | 11/2010 | Ore et al. | |
| 2010/0316223 A1* | 12/2010 | Blom | H04L 63/062 380/278 |
| 2017/0170954 A1* | 6/2017 | Blom | H04L 9/0816 |
| 2017/0245182 A1* | 8/2017 | Xu | H04W 36/08 |
| 2017/0339558 A1* | 11/2017 | Vanderveen | H04L 9/083 |

FOREIGN PATENT DOCUMENTS

| | | |
|---|---|---|
| CN | 1835633 A | 9/2006 |
| CN | 1878058 A | 12/2006 |
| CN | 1937489 A | 3/2007 |
| CN | 1953369 A | 4/2007 |
| EP | 1746797 A1 | 1/2007 |
| JP | 2007104430 A | 4/2007 |
| WO | 9938288 A1 | 7/1999 |
| WO | 2007025484 A1 | 3/2007 |

OTHER PUBLICATIONS

3GPP, 3GPP TSG SA WG3 Security—SA3#47, May 2007.*
3GPP, 3GPP TSG SA WG3 Security—SA3#46b, Mar. 2007.*
3GPP TR 33.821 V0.1.0,3rd Generation Partnership Project;Technical Specification Group Services and System Aspects;Rationale and track of security decisions in Long Term Evolved (LTE)/3GPP System Architecture Evolution (SAE)(Release 8),Feb. 2007,total 82 pages.
3GPP TSG RAN WG3 Meeting #57bis R3-071942,"Key Update in LTE-ACTIVE state",Huawei,Oct. 8-11, 2007,total 6 pages.
3GPP TSG RAN WG3 Security S3#50 S3-080056,"AS key change on the fly (after AKA)",Ericsson, Feb. 25-29, 2008,total 4 pages.
3GPP TSG-RAN WG2 Meeting #58bis R2-072591,"Alternatives for Key Change on the Fly",Nokia, Nokia Siemens Networks,Jun. 25-29, 2007,total 2 pages.
3GPP TSG-RAN WG2 Meeting #58bis Tdoc R2-073002,"Reply LS on Key change in LTE active mode",Ericsson, Jun. 25-29, 2007,total 2 pages.
3GPP TSG RAN WG2#59 R2-073609,"Reply LS on Key change in LTE active mode",SA3,(S3-070616, to RAN2). Reply LS (to R2-073002) on Key change in LTE active mode,Aug. 20-24, 2007,total 2 pages.
3GPP TSG SA WG3 Security—SA3#46b S3-070240,"Key change during LTE_ACTIVE",Nokia, Siemens Networks, Mar. 28-29, 2007,total 5 pages.
3GPP TSG-WG3 Meeting #48 S3-070616,"Reply LS on Key change in LTE active mode",SA3,Jul. 10-13,total 2 pages.
3GPP TSG SA WG3 Security—SA3#47 S3-070475,"LS on Key change in LTE active mode", May 22-25, 2007,total 3 pages.
3GPP TS 36.413 V1.0.0,3rd Generation Partnership Project;Technical Specification Group Radio Access Network;Evolved Universal Terrestrial Access Network (E-UTRAN); S1 Application Protocol (S1AP)(Release 8),Sep. 2007,total 41 pages.
3GPP TS 36.410 V0.1.0 (May 2007);3rd Generation Partnership Project;Technical Specification Group Radio Access Network;Evolved Universal Terrestrial Access Network (E-UTRAN); S1 General Aspects and Principles (Release 8),total 15 pages.
Nokia Siemens Networks, Nokia,"Evaluation of key change on the fly solutions",3GPP TSG SA WG3 Security—SA3#47 S3-070354,Tallinn, Estonia, May 22-25, 2007,total 3 pages.
3GPP TR 33.821 V0.4.0 (Jul. 2007)(S3-070625);3rd Generation Partnership Project;Technical Specification Group Services and System Aspects;Rationale and track of security decisions in Long Term Evolved (LTE) RAN / 3GPP System Architecture Evolution (SAE) (Release 8),total 88 pages.
Ericsson, [Draft] Reply LS on Key change in LTE active mode. 3GPP TSG-RAN WG2 Meeting #58bis, Orlando, U.S.A., Jun. 25-29, 2007, R2-072917, 2 pages.

* cited by examiner

METHOD AND APPARATUS FOR UPDATING A KEY IN AN ACTIVE STATE

CROSS REFERENCE TO RELATED APPLICATIONS

This application is a continuation of U.S. patent application Ser. No. 14/674,155, filed on Mar. 31, 2015, which is a continuation of U.S. patent application Ser. No. 13/587,340, filed on Aug. 16, 2012, now U.S. Pat. No. 9,031,240. which is a continuation of U.S. patent application Ser. No. 12/748,798, filed on Mar. 29, 2010, now U.S. Pat. No. 8,300,827. which is a continuation of International Patent Application No. PCT/CN2008/072534, filed on Sep. 25, 2008, which claims priority to Chinese Patent Application No. 200710151885.5, filed on Sep. 28, 2007, All of the aforementioned patent applications are hereby incorporated by reference in their entireties.

FIELD OF THE INVENTION

The present invention relates to communications field, and more specifically, to method and apparatus for updating a key in an active state.

BACKGROUND

To guarantee the competitive edge of the 3GPP (3rd Generation Partnership Project) in the future, the work on evolved access technology is in progress within the 3GPP organization. Especially to strengthen the capability of 3GPP system for processing rapidly increasing IP data service, packet technology employed in the 3GPP system requires further improvement. Some most important parts of such evolved technology include: decreased delay and reaction time, accelerated user data rate, enhanced system capacity and coverage, and reduced overall cost of the operators. Moreover, the evolved network structure is also an important indicator for the backward compatibility of the existing network. In terms of the security therein, the user security procedure in the evolved network is required to guarantee that a security mechanism is provided which at least has a same level as that of the current 2G and 3G system.

Figure 1:
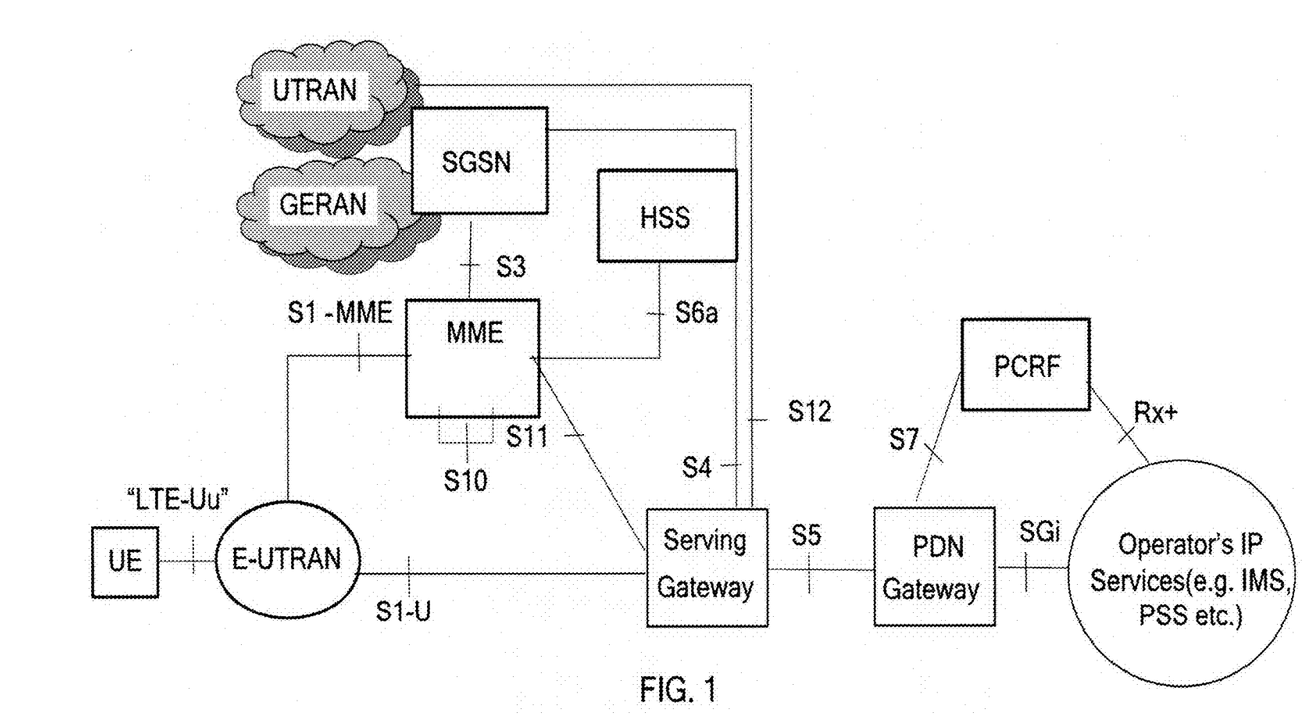
FIG. 1 illustrates a schematic of a wireless evolved network according to the conventional art.

As shown in FIG. 1, the core network of the wireless evolved network mainly includes logic function entities such as a Mobility Management Entity (MME), a System Architecture Evolution Gateway (SAE Gateway), and so forth. The MME is responsible for mobility management of control plane including managing the user context and mobility state, allocating temporary user identification, security function, etc. The SAE Gateway is responsible for paging downlink data in an idle state, managing and storing IP bearer context and routing information in the network, etc., serving as an anchor point for user plane between different access systems. In the wireless evolved network, the security of the user plane is terminated at the access network, where a Base Station (BS) of the access network is referred to as an evolved NodeB (eNB). The security of the signaling plane is divided into two parts, namely Access Stratum signaling Radio Resource Control (RRC) and Non Access Stratum (NAS) signaling, terminated at the access network and the core network respectively. The key required to secure the signaling and the data is derived diversely from keys, i.e., CK, IK, generated during an Authentication and Key Agreement (AKA) procedure. The deriving relations are illustrated as FIG. 2.

Figure 2:
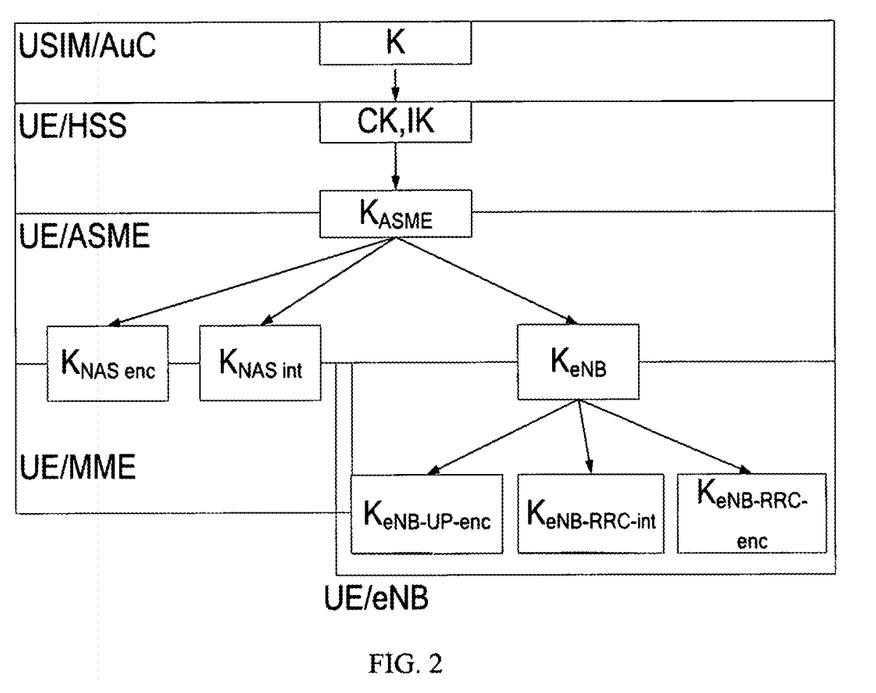
FIG. 2 illustrates a schematic of deriving relations regarding keys according to the conventional art.

Therein, $K_{eNB-RRC-INI}$ is a security key for the integrity of RRC signaling, $K_{eNB-RRC-ENC}$ is a security key for the encryption of RRC signaling, and $K_{eNB-RRC-UP}$ is a security key for the encryption of user plane data, whereas $K_{NAS-ENC}$ is a security key for the encryption of the NAS, and $K_{NAS-INI}$ is a security key for the integrity of NAS signaling.

SUMMARY

A method and an apparatus for updating a key in an active state are provided according to embodiments of the present invention, in order to update the key in the active state.

To this end, a method for updating a key in an active state is provided according to an embodiment of the present invention. The method includes following steps:

initiating a key update by a user equipment in the active state or a network side when a pre-defined condition is met; and updating the key by the network side and the user equipment, and negotiating an activation time of the new keys.

A user equipment for updating a key in an active state is also provided according to an embodiment of the present invention. The user equipment includes:

a terminal key update detecting unit, configured to determine based on a pre-defined condition whether a key update needs to be initiated; and a terminal key update initiating unit, configured to send a key update request message to a network side when the terminal key update detecting unit determines that the key needs to be updated.

A network side entity for updating a key in an active state is also provided according to an embodiment of the present invention. The network side entity includes:

a key update detecting unit, configured to determine based on a pre-defined condition whether a key update needs to be initiated;

a key update initiating unit, configured to send a request message for indicating the key update, when the key update detecting unit determines that the key needs to be updated; and a key updating unit, configured to update the key when the user equipment or the network side entity initiates the key update.

Another method for updating a key in an active state is also provided according to an embodiment of the present invention.

initiating, by a network side, a key update when a pre-defined condition is met; and updating the key by the network side, and informing a user equipment of the new key.

DETAILED DESCRIPTION

In implementing the present invention, it is discovered that the above conventional schema encounters at least the following problems.

In the System Architecture Evolution (SAE)/Long Term Evolution (LTE) system, related discussion involving methods of how the key can be instantly applied to an activating conversation after the key negotiation has already been proposed. All of the methods therein are proposed given that the key has already been updated to be a new key, but no procedure regarding how to acquire the new key is involved. Therefore, it is necessary to provide a method for addressing the issue of how to negotiate new keys in an active state. In addition, the key update in the active state requires that the network side may also have the capacity for initiating the key negotiation. In the conventional art, the network side will not actively initiate the key update procedure. Rather, only after the user switches from a non-active state into an active state and initiates an initial NAS message to the network side, e.g., an attach request, a paging response, a location update request, etc., the network side may determine whether a certain kind of key needs to be updated.

Detailed description will be made to the present invention in connection with the annexed drawings and embodiments.

Figure 3:
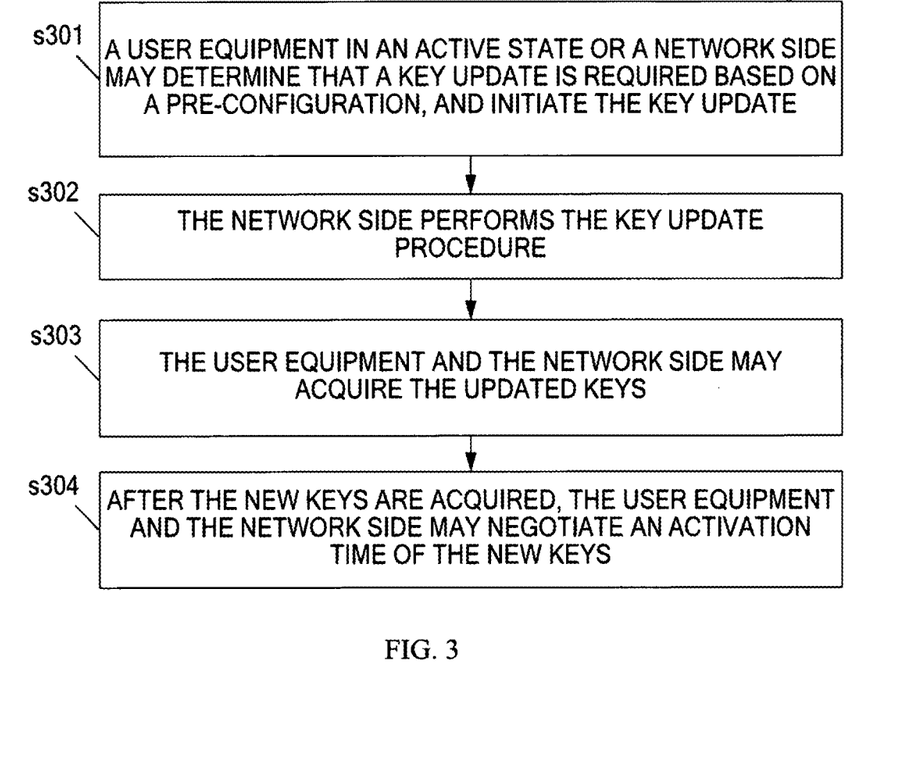
FIG. 3 illustrates a flowchart of a method for updating a key in an active state according to a first embodiment of the present invention.

In the first embodiment of the present invention, a method for updating a key in an active state is that a user equipment (UE) may determine whether the key needs to be updated in the active state. The method for updating the key in the active state is as shown in FIG. 3. The method includes below steps.

Step s301: A user equipment in an active state or a network side may determine that a key update is required based on a pre-configuration, and initiate the key update.

The pre-configuration may include: (1) the user equipment finds out that a COUNT to which the User Plane (UP) or the RRC related is arriving at an upper threshold; (2) the user equipment has performed a handover between two eNBs, a handover within one eNB, or an inter-system handover; (3) the user equipment or the network side finds out that $K_{ASME}$ has not been updated for a long period.

Step s302: The network side performs the key update procedure.

The key update includes: updating all of the keys through the AKA authentication procedure; or, only updating derived keys of $K_{ASME}$ rather than performing AKA to update $K_{ASME}$.

Step s303: The user equipment and the network side may acquire the updated keys.

Step s304: After the new keys are acquired, the user equipment and the network side may negotiate an activation time of the new keys.

Detailed description will be made to the present invention in connection with different application scenarios.

Figure 4:
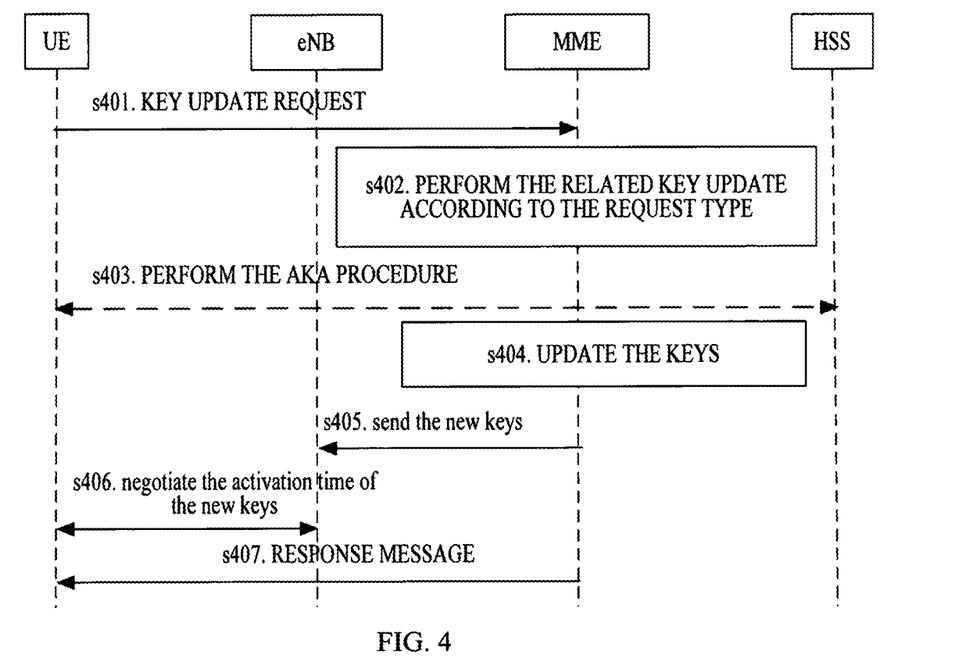
FIG. 4 illustrates a flowchart of updating a key in an active state which is actively initiated by a UE according to a second embodiment of the present invention.

In the second embodiment of the present invention, a method for updating a key in an active state is as shown in FIG. 4, where the UE may actively initiate the key update procedure in the active state. The method includes below steps.

Step s401: When in active state, the UE finds out that the key needs to be updated due to some reason, the UE may actively trigger the key update procedure to the MME at the network side.

The possible reasons for updating the key may include: (1) the COUNTs to which the UP or the RRC related is arriving at the upper threshold; (2) the UE just has performed a handover to a new eNB; (3) $K_{ASME}$ has not been updated for a long period. The UE may trigger the key update procedure by sending to the MME, a TAU/RAU request, or a special attach request, or a special service request, or a key update request message.

If the key update is trigged by means of sending a TAU/RAU message as the key update request, even if no update occurs for location/routing area of the UE, this TAU/RAU request may also be sent, in which that the old routing area identification is identical with the new routing area identification. To identify the key update request, Update type in the TAU/RAU request may be set as a special value, indicating that the key needs to be updated. The special value may utilize a unified special value for different reasons, or may distinctively utilize different values regarding different reasons (a RRC/UP counter value overflows, or a handover has been performed, or lifetime of $K_{ASME}$ expires). Or, the UE may not indicate, but employ several existing values (e.g., the values indicating the routing/ location area changing). In addition, since a periodic location registration requires no key update, the Update type shall be distinguished from it. To distinguish from the periodic location/routing registration, it is better for the Update type to employ a value other than the value indicating the "Periodic updating" such as 000.

Notes: several values for the Update type in the existing UMTS are as shown in Table 1.

TABLE 1

| 0 | 0 | 0 | RA updating |
| 0 | 0 | 1 | combined RA/LA updating |
| 0 | 1 | 0 | combined RA/LA updating with IMSI attach |
| 0 | 1 | 1 | Periodic updating |

Step s402: After the MME receives the request that triggers the key update procedure (may be one of the requests mentioned at step 401), the MME may perform the related key update procedure according to the request type.

The AKA authentication procedure may be initiated if $K_{ASME}$ needs to be updated, e.g., an inter-system handover has been performed from GSM/UMTS to SAE/LTE, or lifetime of $K_{ASME}$ expires.

New derived keys may be calculated based on $K_{ASME}$, if there is no need to update $K_{ASME}$, and only its derived keys need to be updated, e.g., the key update is required when a handover has been performed within the LTE system, or as a RRC/UP counter value arrives at an upper threshold, in which case only $K_{eNB}$, or together with $K_{NAS-int}$ and $K_{NAS-enc}$ may be updated.

Step s403: The AKA procedure is performed to update the keys if it is determined to update $K_{ASME}$ at step s402. This step is optional.

Step s404: Each key is updated according to the determination at step s402. The related key is calculated based on the existing $K_{ASME}$ key, if only the derived keys of $K_{ASME}$ needs to be updated.

Step s405: The MME sends the new keys to the eNB.

Step s406: The eNB and the UE negotiate the activation time of the new keys.

The eNB may notify the activation time of the new keys using one of the following methods, or a method other than the following ones.

(1) The eNB may inform the UE of the activation time of the new keys via a simplified security mode command, and the UE may acknowledge the reception of the security mode command. The UE and the network side may activate the new key according to the activation time of the new keys. If the NAS keys need to be updated, step s405 may further include initiating an NAS security mode command in order to negotiate the activation time of new NAS keys.

(2) The eNB may initiate an intra-cell handover command, requesting the UE to perform handover to a current serving cell of the eNB itself so that the UE may use the new keys.

(3) The eNB may add a KSI along with each data packet in order to indicate which key the UE could use for decryption.

In addition to the above methods, one may also refer to the below description described in step s801 in the seventh embodiment or step s901 in the eighth embodiment.

Step s407: The network side sends a response message to the user in order to complete all the procedures for key update.

It is to be noted that the activation time of the new NAS keys may also be carried in this response.

Figure 5:
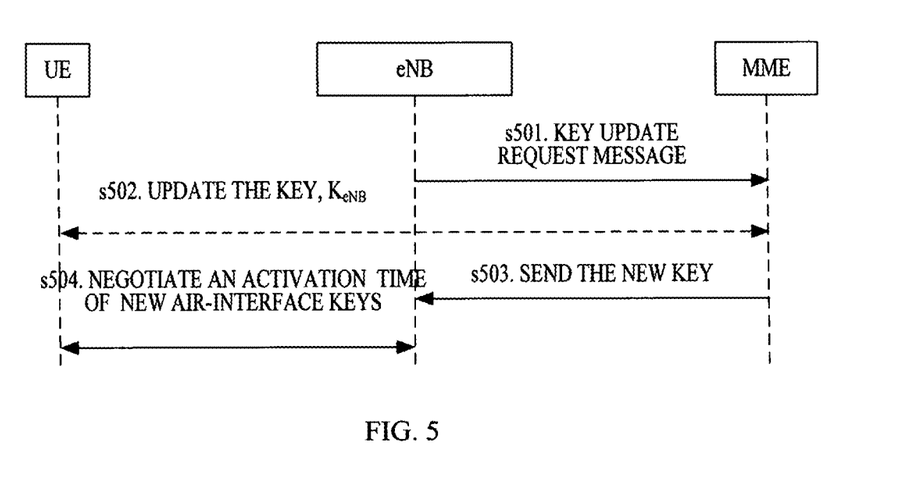
FIG. 5 illustrates a flowchart of updating a key in an active state which is actively initiated by an eNB at a network side according to a third embodiment of the present invention.

In the third embodiment of the present invention, a method for updating a key in an active state is as shown in FIG. 5, where the eNB at the network side may actively initiate the key update procedure in the active state.

The present embodiment refers to the key update procedure initiated by the eNB. When the COUNTs related to the UP or RRC encryption/integrity security is about to arrive at an upper threshold (about to wrap around), the related key may probably need to be updated in order to prevent repeated key stream. Or, even if the COUNTs does not arrive at the upper threshold, but the UE is in LTE_ACTIVE state for a long period, the user plane security key, i.e., Kup-enc or KeNB, may probably need to be updated. In the two scenarios above, there is no need to update $K_{ASME}$ and $K_{MME}$, only $K_{up}$ and $K_{RRC}$ need to be updated. Of course, at this point, $K_{ASME}$ may also be updated.

The key update procedure in the third embodiment is described as follows.

Step s501: When the eNB finds out the key needs to be updated according to the above security requirement, the eNB may send to the MME a key update request message, requesting the MME to generate a new $K_{eNB}$. The MME may then derive a new $K_{eNB}$ from $K_{ASME}$.

The key update request message may probably be: (1) a request message specifically for requesting the MME to update the key by the eNB, where an MME response is required regarding this request message; (2) a notification type of message, notifying the MME that the key needs to be updated, where no MME response is required regarding this notification message.

Step s502: The MME may update the key, $K_{eNB}$, accordingly. Therein, $K_{eNB}$ may be derived by the MME from the existing $K_{ASME}$, or, may be calculated by the MME after $K_{ASME}$ is updated through the AKA procedure.

Step s503: The MME sends the new $K_{eNB}$ to the eNB. The MME may send the key to the eNB in the following manners:

(1) via a key update response message corresponding to the key update request sent by the eNB according to step s501;

(2) via a context modification message actively initiated by the MME, where the new key is sent to the eNB in the modification message;

(3) via a security context modification message actively initiated by the MME, where the new key is sent to the eNB in the modification message.

It is to be noted that in addition to the new $K_{eNB}$, the MME may also need to send other parameters required for calculating $K_{eNB}$ to the eNB in the above manners. For example, when the MME is calculating the new key using the existing $K_{ASME}$, a variable parameter (e.g., a counter, a random number) may probably need to be introduced. Thus, this variable parameter may also need to be sent to the eNB and then sent to the UE via the eNB, so that the UE may calculate the new $K_{eNB}$ using the same parameter.

The eNB may derive new $K_{UP}$ and $K_{RRC}$ based on this new $K_{eNB}$. C-RNTI or a random number may be employed as an input parameter during the deriving procedure. If C-RNTI is employed, the original C-RNTI may probably be utilized, or a C-RNTI parameter may probably be newly generated for the UE.

Step s504: An air-interface new key initiating procedure, i.e., a method concerning how to negotiate an activation time of the new keys is provided. In addition to the methods descried in the prior description such as the Packet Data Convergence Protocol (PDCP) SN or KSI, or the UE is forced to perform an active-idle-active state transition, or an intra-cell handover, one may also refer to the below description described in step s801 and step s802 in the seventh embodiment or step s901 and step s902 in the eighth embodiment.

If the MME sends $K_{eNB}$ in the manner (2) at step s503, the eNB may probably need to send a response message of (security) context modification after the new key is activated.

In the fourth embodiment of the present invention, a method for updating a key in an active state is as shown in FIG. 5, where the eNB at the network side may actively initiate the key update procedure in the active state.

The present embodiment refers to the key update procedure initiated by the eNB. When the COUNTs related the UP or RRC encryption/integrity security is about to arrive at an upper threshold (about to wrap around), the related key may probably need to be updated in order to prevent repeated key streams. Or, even if the COUNTs does not arrive at the upper threshold, but the UE is in LTE_ACTIVE state for a long period, the user plane security key, i.e., $K_{UP-enc}$ or $K_{eNB}$, may probably need to be updated. In the two scenarios above, there is no need to update $K_{ASME}$ and $K_{MME}$, only $K_{up}$ and $K_{RRC}$ need to be updated.

The difference between the third embodiment and the present embodiment is that $K_{eNB}$ is updated in the third embodiment whereas $K_{eNB}$ is not updated in the present embodiment. The key update procedure in the fourth embodiment is described as follows.

(1) When the eNB finds out that the key needs to be updated (the eNB finds out that the key needs to be updated according to the security requirement mentioned above), the eNB may generate a random number or a new C-RNTI, and then generate a new RRC/UP key using $K_{eNB}$ and other parameters.

(2) The eNB may inform the UE of the new key parameters via the air-interface key update procedure. The air-interface key update procedure utilized herein may refer to the description of following embodiments.

Figure 6:
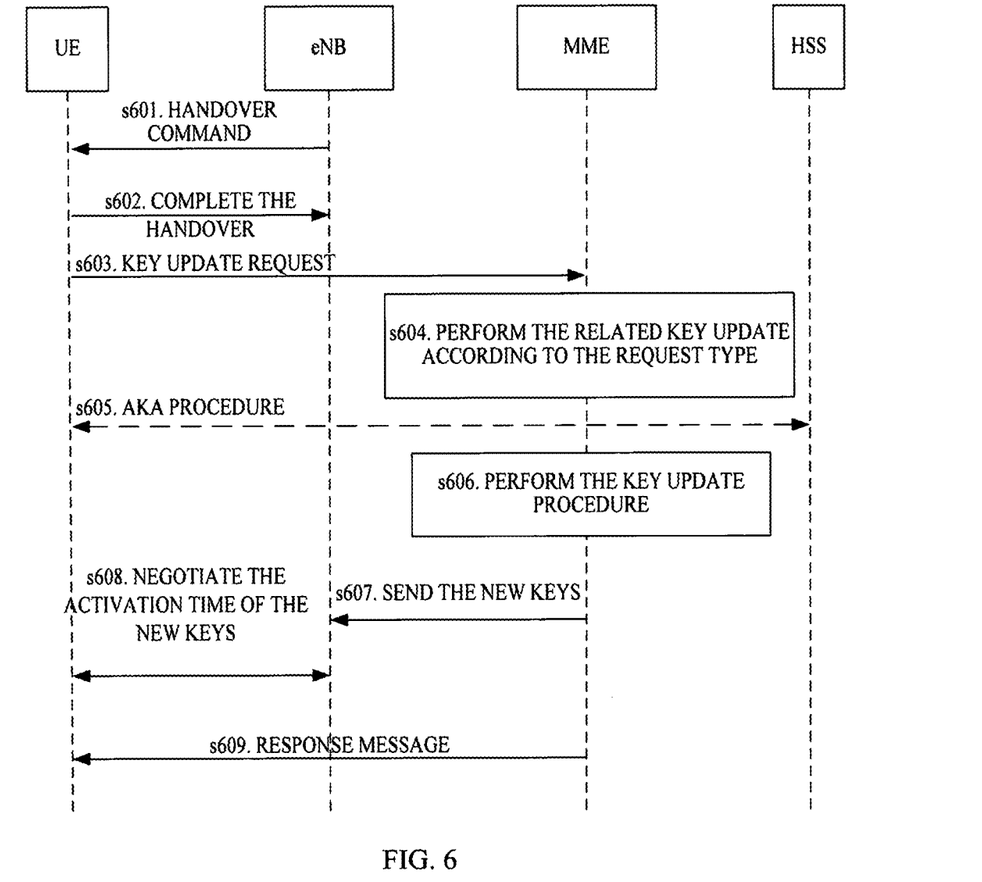
FIG. 6 illustrates a flowchart of updating a key in an active state which is actively initiated by an eNB at a network side according to a fifth embodiment of the present invention.

In the fifth embodiment of the present invention, a method for updating a key in an active state is as shown in FIG. 6, where the eNB at the network side may actively initiate the key update procedure in the active state. The method includes below steps.

Step s601: In a non-handover scenario, if the network side such as eNB desires to update the key, an intra-cell handover command is thus sent to the UE, i.e., requesting the UE to perform handover to the source cell (target cell is identical with source cell).

Step s602: The UE may access the eNB cell again upon the receipt of the handover command.

The description of step s603 to step s609 in the follow-up procedure may refer to step s401 to step s407 in the second embodiment, which is omitted herein for brevity.

Figure 7:
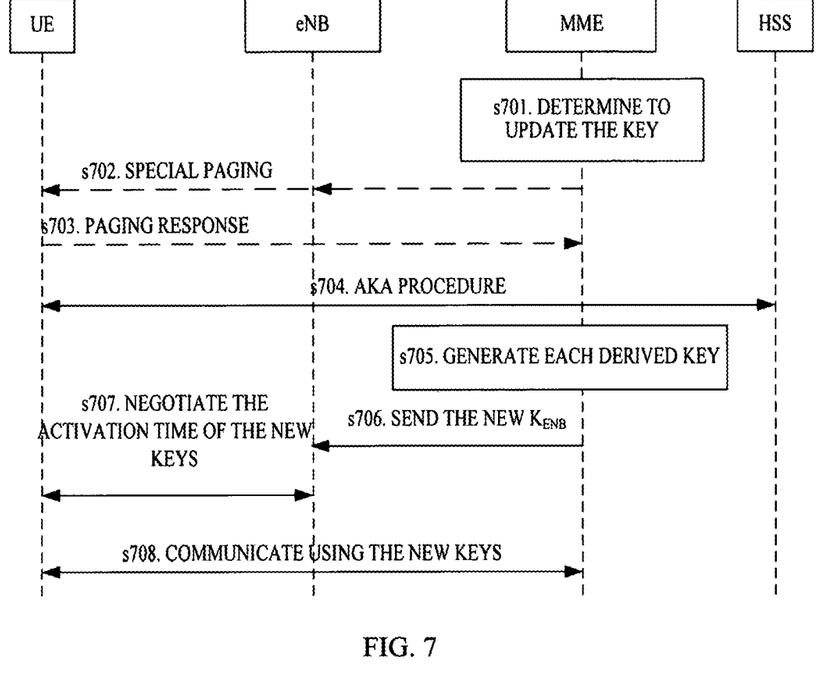
FIG. 7 illustrates a flowchart of updating a key in an active state which is actively initiated by an MME at a network side according to a sixth embodiment of the present invention.

In the sixth embodiment of the present invention, a method for updating a key in an active state is as shown in FIG. 7, where the MME at the network side may actively initiate the key update procedure. The method includes below steps.

Step s701: When the MIME at the network side finds out that $K_{ASME}$ has been used for a long period or an inter-RAT handover has been performed to the UE and so forth, after which $K_{ASME}$ needs to be updated, the MME may then determine to actively initiate the AKA procedure. The network side needs to set a valid time for each $K_{ASME}$ so that a corresponding procedure can be triggered instantly when the valid time arrives at the upper threshold.

Step s702: The MME actively initiates a special paging message to the UE. This step is optional.

A Paging cause of the special paging request may be NULL or a special value indicative of the key update.

Step s703: The UE sends a paging response to the network upon the receipt of the paging message.

Steps s702 and s703 are optional.

Step s704: When the MME sends to the UE an authentication request message in order to initiate to perform the AKA, or upon the receipt of the paging response, similar to the receipt of the paging message according to the conventional art, the MME may thus determine to perform the AKA, and may initiate the AKA procedure to the UE.

Step s705: The MME generates each derived key.

Step s706: The MME sends $K_{eNB}$ to the eNB. $K_{eNB}$ may be sent specifically in the manner of carrying the $K_{eNB}$ in the NAS message and informing the UE of the activation time of the new NAS keys, which is optional.

The MME may send the new key to the eNB in one of the following manners:

(1) employing a context modification message that is actively sent to the eNB; the context modification message may employ a special S1 initial context establishment message, or a newly defined S1 interface signaling. The context modification message includes the new key.

(2) employing a security context modification message that is actively sent to the eNB. The security context modification message includes the new key.

Of course, other similar messages may also be employed for the sending.

Step s707: The eNB and the UE negotiate the activation time of the new keys. Optionally, the activation time of the NAS keys may also be negotiated during this procedure.

Step s708: The user communicates with the network side using the new keys.

In respect of the newly generated key, the eNB needs to inform the UE of the start of the new keys via the air-interface key update procedure. During the key update procedure, the main purpose of the air-interface key update procedure is to: (1) send parameters relating to the derived keys to the UE, e.g., a new C-RNTI or a random number; (2) inform the UE of the activation time of the keys.

Figure 8:
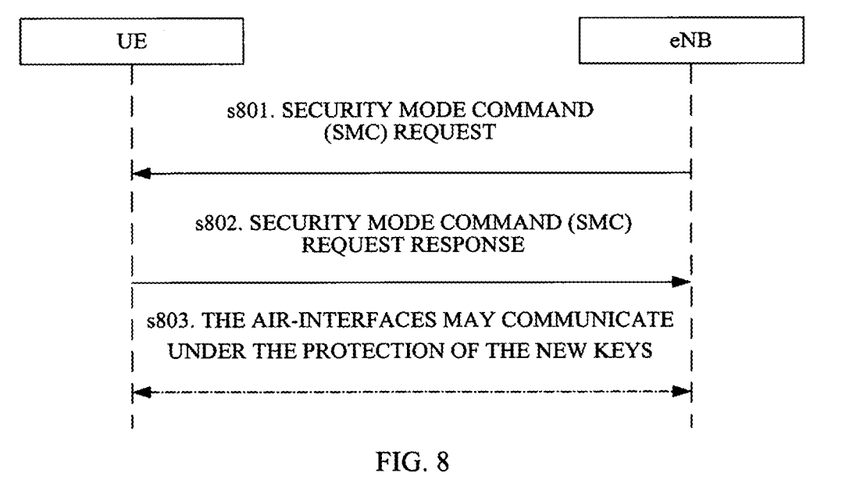
FIG. 8 illustrates a flowchart in which an eNB informs a UE of new keys via an air-interface key update procedure according to a seventh embodiment of the present invention.

In the seventh embodiment of the present invention, the description is made by way of Security Mode Command (SMC) procedure as an example, where the eNB informs the UE of the start of the new keys via the air-interface key update procedure. Referring to FIG. 8, following steps are included.

Step s801: The eNB determines based on triggering reasons that a special SMC message needs to be sent to the UE.

The SMC message may include one or more of the following parameters: (1) parameters required for deriving the key such as a new C-RNTI, a random number, and so forth; (2) a downlink activation time of the NAS keys; (3) a downlink activation time of the RRC keys; (4) an uplink and a downlink activation time of the user plane keys; (5) other possible parameters, e.g., an activation time of new keys for determining uplink data packets (including data packets of the user plane and the control plane).

In addition, when a downlink message is sent by the eNB, the eNB may: (1) stop sending the downlink data, so that the downlink activation time may begin from a next data packet; (2) continue to send data packets, but the PDCP SN for activating using of new keys may be set a little larger so as to avoid a key activation error due to the rapid sending of the packets.

Of course, in addition to the SMC message, a new command such as newly defined security context modification command/security re-configuration command may also be utilized to request the UE to switch the key in use according to parameters or a time carried in the command.

Step s802: The UE returns a corresponding message to the eNB upon the receipt of the related message.

Specifically, upon the receipt of the SMC message, the UE may derive new keys based on the related parameters. Optionally, an activation time of the uplink data packets (including data packets of the user plane and the control plane) may also be required. The UE may then return the related message to the eNB. A PDCP SN for initiating the new keys is carried in the related message. The UE may not stop sending the data packets, but calculate new keys and acquire activation time of the new keys, and then send the new activation time to the eNB. At this point, the activation time of the keys for the uplink data packets needs to be set a little backward if this method is adopted.

Step s803: The air-interfaces may communicate under the protection of the new keys.

Figure 9:
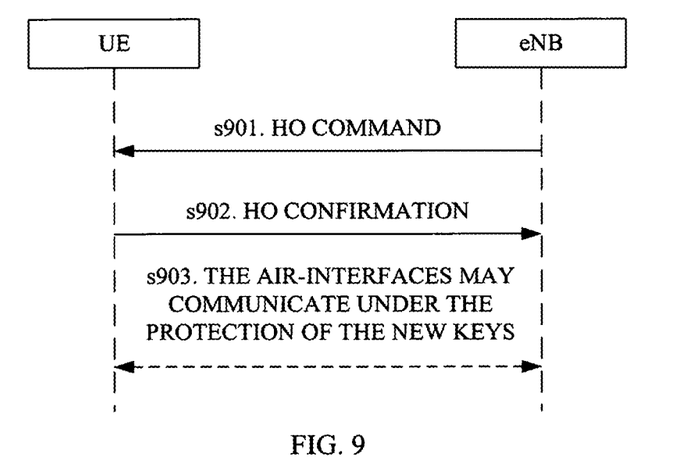
FIG. 9 illustrates a flowchart in which an eNB informs a UE of new keys via an air-interface key update procedure according to an eighth embodiment of the present invention.

In the eighth embodiment of the present invention, the description is made by way of an intra-cell handover procedure as an example, where the eNB informs the UE of a new key activation via the air-interface key update procedure. Referring to FIG. 9, following steps are included.

Step s901: The eNB determines based on triggering reasons that an HO Command message needs to be sent to the UE.

In normal cases, the HO Command message may be sent to the UE in order to tell the UE to perform handover to another Cell, so that the HO Command message may carry air recourses, C-RNTI, etc., assigned by the another Cell. However, in the embodiment, the HO Command message is merely to tell the UE to activate the updated keys rather than to instruct the UE to perform handover to other Cells. Therefore, some transformations on the parameters may be required: (1) "transparent container for Target eNB to UE" in the original HO Command message should be removed; (2) the C-RNTI in the original message assigned to the UE by "target eNB cell" shall be modified as a new C-RNTI assigned by "Source eNB cell" itself; (3) an activation time of the NAS keys probably required should be added; (4) a downlink activation time of the RRC keys shall be added; (5) a downlink activation time of the user plane keys shall be added; (6) values for the reason shall be added, telling the UE that the present HO Command message is to instruct the UE to update the key rather than to perform a real handover.

Moreover, according to general requirements of the HO Command, the eNB will not deliver any data packet after the HO Command message is sent.

Step s902: After the HO Command message is received by the UE, the UE may: (1) determine based on the values of the reason that the present handover is merely for the key update, and therefore synchronizing with the new cell is not required; (2) stop sending the uplink data packets; (3) derive new keys; (4) determine an activation time of the uplink data packets; (5) send a message to the eNB, informing the eNB of the activation time of the uplink data packets.

Step s903: The UE and the eNB may communicate with each other under the protection of the new keys.

With the methods provided according to the embodiments of the present invention, the user equipment in the active state and the network side may actively initiate the key update procedure in different cases, thereby solving the problem concerning the key update for a session in the active state. In addition, the implementation procedure is simple and easy to accomplish.

Figure 10:
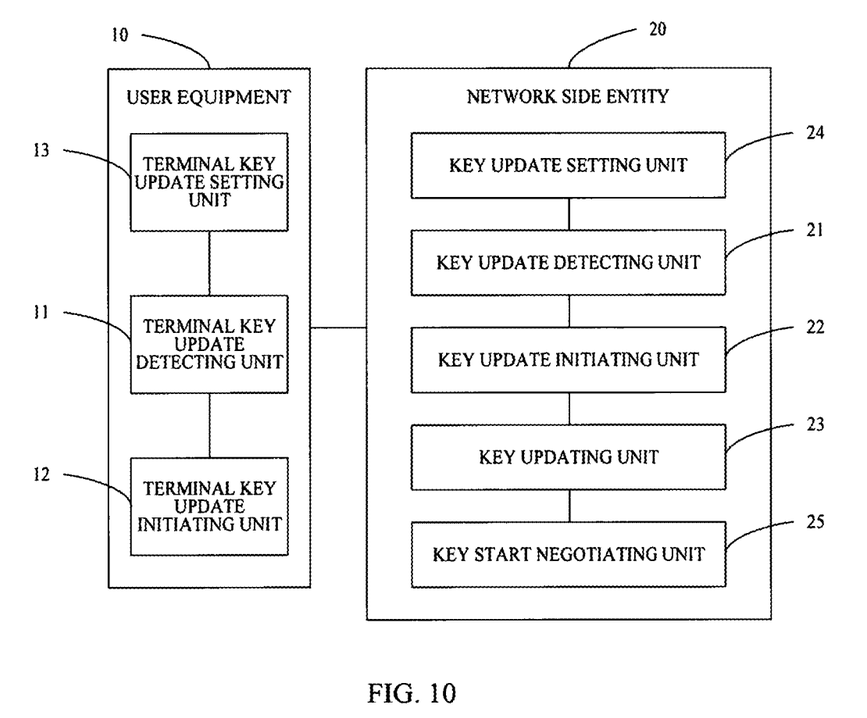
FIG. 10 illustrates a schematic of a system for updating a key in an active state according to a ninth embodiment of the present invention.

In the ninth embodiment of the present invention, a system for updating a key in an active state is also disclosed. Referring to FIG. 10, the system includes at least a user equipment 10 and a network side entity 20, where the user equipment in the active state and the network side entity may initiate the key update and update the key when a pre-defined condition is met.

Specifically, the user equipment 10 further includes:
a terminal key update detecting unit 11, configured to determine based on a pre-defined condition whether the key update needs to be initiated;
a terminal key update initiating unit 12, configured to send a key update request message to the network side entity 20 when the terminal key update detecting unit 11 determines that the key needs to be updated; and
a terminal key update setting unit 13, configured to pre-define the condition for initiating the key update and provide the condition to the terminal key update detecting unit 11.

Specifically, the network side entity 20 specifically includes:
a key update detecting unit 21, configured to determine based on a pre-defined condition whether the key update needs to be initiated;
a key update initiating unit 22, configured to send a request message to the user equipment 10 for instructing the key update, when the key update detecting unit 21 determines that the key needs to be updated;

a key updating unit 23, configured to update the key when the user equipment 10 or the network side entity 20 initiates the key update;
a key update setting unit 24, configured to pre-define the condition for initiating the key update and provide the condition to the key update detecting unit 21; and
a key start negotiating unit 25, configured to negotiate an activation time of the new keys with the user equipment.

Therein, the functions of the units mentioned above may be realized via the MME at the network side and the eNB.

With the systems and the apparatuses provided according to the embodiments of the present invention, the user equipment in the active state and the network side may actively initiate the key update procedure in different cases, thereby solving the problem concerning the key update for a session in the active state. In addition, the implementation procedure is simple and easy to accomplish.

Compared with the conventional art, the embodiments of the present invention enjoy the following advantages: The user equipment in the active state and the network side may actively initiate the key update procedure in different cases, thereby solving the problem concerning the key update for a session in the active state.

With the description of the foregoing embodiments, it is readily appreciated by those skilled in the art that the present invention may be implemented with hardware, and may also be implemented with software on a necessary hardware platform. Based on this understanding, solutions provided by the present invention may be embodied in a software product. The software product may be stored in a nonvolatile storage media (may be a CD-ROM, a USB flash disc, a mobile hard disc, etc.) The software product may include a set of instructions enabling a computer device (may be a personal computer, a server, or a network device, etc.) to perform methods according to various embodiments of the present invention. In addition, the foregoing embodiments take SAE/LTE system as an example. The eNB described in the foregoing embodiments refers to a Base Station (BS) of the SAE/LTE system. It is readily appreciated by those skilled in the art that the BS is not limited to the eNB. Any Base Station that realizes the similar function as the eNB stated above shall fall within the scope of protection of the present invention.

In summary, the foregoing is merely preferred embodiments of the present invention and is not intended to be limiting to the scope of the present invention. Any modifications, equivalents, improvements made within the spirit and principle of the present invention shall be construed as fall within the scope of the present invention.

What is claimed is:

1. A method performed by an access network node of a communication network for updating air interface keys for use by the access network node for security communications with user equipment (UE) after an Authentication and Key Agreement (AKA) procedure is carried out after an inter-system handover of the UE to the access network node, comprising:
receiving, by the access network node from a mobility management entity of the communication network, a context modification message containing a key for deriving the air-interface keys for use by the access network node, wherein the context modification message is for changing UE context information; and
updating, by the access network node using the received key, the air-interface keys for use by the access network node for security communications with the UE.

2. The method according to claim 1, further comprising:
sending, by the access network node, an intra-cell handover command to the user equipment, wherein the intra-cell handover command is configured to instruct the user equipment to update air-interface keys used by the user equipment for communicating with the access network node.

3. The method according to claim 1, wherein the inter-system handover is a handover from a SAE/LTE network.

4. The method according to claim 1, further comprising:
negotiating, by the access network node with the user equipment, an activation time of the air-interface keys, via an intra-cell handover procedure.

5. An access network node of a communication network, comprising:
a receiver configured to receive from a mobility management entity of the communication network a context modification message containing a key for deriving air-interface keys for use by the access network node for security communications with user equipment (UE), wherein the context modification message is for changing UE context information after an Authentication and Key Agreement (AKA) procedure is carried out after an inter-system handover the UE to the access network node;
a key updating unit, configured to update, using the received key, the air-interface keys for use by the access network node for security communications with the UE.

6. The access network node according to claim 5, wherein the key updating unit is further configured to send an intra-cell handover command to the user equipment to instruct the user equipment to update air-interface keys used by the user equipment for communicating with the access network node.

7. The access network node according to claim 5, wherein the inter-system handover is a handover from a SAE/LTE network.

8. The access network node according to claim 5, wherein the key updating unit is further configured to negotiate with the user equipment an activation time of the air-interface keys via an intra-cell handover procedure.

9. A non-transitory computer-readable storage medium comprising instructions which, when executed by a computer of an access network node, cause the computer to perform operations for updating air-interface keys, after an Authentication and Key Agreement (AKA) procedure is carried out after an inter-system handover of user equipment (UE) to the access network node, the operations comprising:
receiving from a mobility management entity a context modification message containing a key for deriving the air-interface keys, wherein the context modification message is for changing UE context information;
updating, using the received key, the air-interface keys for security communications with the UE.

10. The non-transitory computer-readable storage medium according to claim 9, further comprising instructions which, when executed by the computer cause the computer to send an intra-cell handover command to the user equipment, wherein the intra-cell handover command is configured to instruct the user equipment to update air-interface keys used by the user equipment for communicating with the access network node.

11. The non-transitory computer-readable storage medium according to claim 9, wherein the inter-system handover is a handover from a SAE/LTE network.

12. The non-transitory computer-readable storage medium according to claim 9, further comprising instructions which, when executed by the computer cause the computer to negotiate with the user equipment an activation time of the air-interface keys via an intra-cell handover procedure.

13. A method for updating air interface keys, comprising:
initiating, by a mobility management entity, an Authentication and Key Agreement (AKA) procedure after user equipment (UE) has performed an inter-system handover;
transmitting, by the mobility management entity to an access network node, a context modification message containing a key for deriving the air-interface keys for use by the access network node, wherein the key for deriving the air-interface keys for use by the access network node is derived at least in part from a key generated during the AKA procedure, and the context modification message is for changing UE context information; and
updating, by the access network node using the received key, the air-interface keys for use by the access network node for security communications with the UE.

14. The method according to claim 13, further comprising:
sending, by the access network node, an intra-cell handover command to the UE, wherein the intra-cell handover command is configured to instruct the UE to update air-interface keys used by the user equipment for communicating with the access network node.

15. The method according to claim 13, wherein the inter-system handover is a handover from a SAE/LTE network.

16. The method according to claim 13, further comprising:
negotiating, by the access network node with the UE, an activation time of the air-interface keys, via an intra-cell handover procedure.

17. A system for updating air interface keys, comprising:
a mobility management entity; and
an access network node; wherein
the mobility management entity is configured to initiate an Authentication and Key Agreement (AKA) procedure after user equipment (UE) has performed an inter-system handover, and configured to transmit to an access network node, a context modification message containing a key for deriving the air-interface keys for use by the access network node, wherein the key for deriving the air-interface keys for use by the access network node is derived at least in part from a key generated during the AKA procedure, and the context modification message is for changing UE context information; and
the access network node is configured to update, by using the received key, the air-interface keys for use by the access network node for security communications with the UE.

18. The system according to claim 17, the access network node is further configured to send an intra-cell handover command to the UE, wherein the intra-cell handover command is configured to instruct the UE to update air-interface keys used by the user equipment for communicating with the access network node.

19. The system according to claim 17, wherein the inter-system handover is a handover from a SAE/LTE network.

20. The system according to claim 17, the access network node is further configured to negotiate with the UE, an activation time of the air-interface keys, via an intra-cell handover procedure.

* * * * *